United States Patent [19]

Chaplin

[11] Patent Number: 5,157,494
[45] Date of Patent: Oct. 20, 1992

[54] APPARATUS AND METHOD FOR COMBINING VIDEO SIGNALS TO PROVIDE AN OUTPUT SIGNAL WITH FULL FIELD COVERAGE

[75] Inventor: Daniel J. Chaplin, Nevada City, Calif.

[73] Assignee: The Grass Valley Group, Inc., Nevada City, Calif.

[21] Appl. No.: 677,080

[22] Filed: Mar. 29, 1991

[51] Int. Cl.⁵ .................... H04N 5/265; H04N 5/262
[52] U.S. Cl. .................................. 358/183; 358/181; 358/22
[58] Field of Search ............... 358/183, 182, 181, 22, 358/22 CK, 22 PIP, 22 C

[56] References Cited

U.S. PATENT DOCUMENTS

| | | | |
|---|---|---|---|
| 4,109,278 | 8/1978 | Mendrala | 358/22 CK |
| 4,319,266 | 3/1982 | Bannister | 358/22 CK |
| 4,395,733 | 7/1983 | Elenbaas | 358/183 |
| 4,630,101 | 12/1986 | Inaba | 358/183 |
| 4,698,682 | 10/1987 | Astle | 358/22 CK |
| 4,947,240 | 8/1990 | Hausdorfer | 358/22 |
| 4,970,595 | 11/1990 | Bloomfield | 358/183 |
| 5,010,407 | 4/1991 | Trytko | 358/183 |
| 5,016,105 | 5/1991 | Muller | 358/182 |
| 5,027,213 | 6/1991 | Kamin | 358/182 |
| 5,040,066 | 8/1991 | Arbeiter | 358/22 |

Primary Examiner—James J. Groody
Assistant Examiner—Sherrie Hsia
Attorney, Agent, or Firm—John Smith-Hill

[57] ABSTRACT

Apparatus for combining video signals comprises first and second static effect channels for generating first and second full-field video signals respectively. A transition control signal generator generates first and second transition control signals each having a full-field domain and a predetermined range, the sum of the first and second control signals nowhere exceeding the predetermined range. Arithmetic circuitry multiplies the first video signal by the first transition control signal to generate a first addend signal, multiplies the second full-field video signal by the second transition control signal to generate a second addend signal, and sums the first and second addend signals to provide an output video signal.

12 Claims, 5 Drawing Sheets

APPARATUS AND METHOD FOR COMBINING VIDEO SIGNALS TO PROVIDE AN OUTPUT SIGNAL WITH FULL FIELD COVERAGE

BACKGROUND OF THE INVENTION

This invention relates to a method and apparatus for combining video signals.

A typical television broadcast is formed by a sequence of static video effects, each composed of a background and, optionally, at least one key. The key is an area of key video that appears to be in front of the background and is limited spatially by an associated key control signal. In the context of a news broadcast, the background of the current, or on-air, effect might be a studio backdrop and the foreground of the on-air effect might be a newscaster, while the background of the next effect in the sequence might be a scene of a sports events and the foreground of the next effect a sports announcer. Alternatively, the background of the on-air effect might be a scene of a sports event and the foreground of the on-air effect a sports announcer, while the next effect is the scene of the sports event without the sports announcer. Depending on the key control signal, the area of the key can change, for example when the sports announcer gestures or a weather forecaster points to a region of a weather map background, but nevertheless the effect is considered to be a static effect.

A dynamic effect, or transition, occurs when there is a change from one static effect to another static effect. A change in the area occupied by a key is not considered to be a transition. A mix/effects (M/E) device is used to provide a transition that is not visually disturbing to the viewer.

One method of providing a transition from the on-air effect to the next effect is to use a wipe border matte effect. The wipe border matte effect will be described with reference to FIG. 1, which illustrates a typical serial architecture for an M/E device.

The M/E device shown in FIG. 1 comprises six video mixers 9-14 connected in series. Each mixer receives a mix control signal at its X input and full-field video signals at its Y and Z inputs and provides an output signal represented by the equation:

$$Output = XY + (1-X)Z$$

The mix control signal can range in value between 0, or fully off, and 1, or fully on, and therefore the output signal can be all Y, all Z, or a linear mix of Y and Z. The mix control signal can vary as a function of position in the video field and/or as a function of time, from frame to frame.

Mixer 9 receives a border matte video signal at its Z input, and the outputs of mixers 9-13 are connected to the Z inputs of mixers 10-14 respectively. The desired output signal is provided at the output of mixer 14.

Mixers 9 and 10 receive at their Y inputs respective video signals of program A and program B, which are the backgrounds of the on-air effect and the next effect respectively. Mixers 11-14 receive at their Y inputs respective key video signals, designated key 1 video-key 4 video. Key control signals, designated key 1 control-key 4 control, are associated with key 1 video-key 4 video respectively and will be discussed further below. Each key control signal is similar to a video signal, and is used to define an area of the video field.

The mix control signals received by mixers 9 and 10 at their X inputs are referred to as transition control signals and are designated transition control signal T1 and transition control signal T2 respectively. The transition control signals T1 and T2 are generated by a transition control signal generator 16 which functions in response to signals provided by an operator interface 18. The mix control signals received by mixers 11-14 are provided by respective multipliers 21-24, each of which receives a key control signal at its X input. The Y inputs of multipliers 21-24 are connected to respective selector switches 31-34, each of which is able to select logical 0, logical 1, T1 or T2. The output signal of each multiplier is represented by the equation:

$$Output = XY$$

It will be apparent from FIG. 1 that the selector switches 31-34 can be set so that if the transition control signals T1 and T2 were set to 1 and 0 respectively for the entire field, an effect could be composed of program A background with key 1 video within the area defined by key 1 control. If, on the other hand, the transition control signals T1 and T2 were set to 0 and 1 respectively for the entire field, an effect composed of program B background with key 2 video within the area defined by key 2 control could be provided. If, as shown schematically in FIG. 1, the transition control signal T1 were 1 for a region at the right of the field and the transition control signal T2 were 1 for a region at the left of the field, an effect could be composed in which program A plus key 1 is shown at the right of the field, program B plus key 2 is shown at the left of the field, and the border matte appears as a vertical stripe down the center of the field. The transition control signals T1 and T2 can be varied dynamically in response to control signals provided by the operator interface 18, such that the size of the region for which the transition control signal T1 is 1 becomes smaller and the size of the region for which the signal T2 is 1 becomes larger. Thus, the vertical stripe sweeps across the field from left to right, providing a wipe from an on-air effect composed of program A plus key 1 to a next effect composed of program B plus key 2.

It will be appreciated that in the case of the example that has just been described, mixers 13 and 14 are not used and accordingly selector switches 33 and 34 are each set to the zero input.

The M/E device shown in FIG. 1 is subject to certain disadvantages. For example, during a mix transition or a soft wipe, when the mix control signal for a given key mixer is between 0 and 1, so that the associated key video should be present at the output of the mixer, the key video is partially transparent and a lower priority key video and/or background video might be visible through the higher priority key video. Also, in the ME device shown in FIG. 1, the background of the output effect is created by mixers 9 and 10 and the keys are added by mixers 11-14 after the background has been composed, and therefore the ME device is unable to provide a preview output of the next effect.

FIG. 2 shows a parallel M/E device in which each component of the desired output effect is multiplied by a control signal that limits the component to the desired area of the video field. The desired output effect is composed in the manner of a patchwork. A disadvantage of the M/E device shown in FIG. 2 is that the processing of the control signals can be quite complicated, and therefore the circuitry for generating the control signals is complex. As in the case of FIG. 1, a preview output of the next effect cannot be provided.

SUMMARY OF THE INVENTION

In accordance with a first aspect of the invention, apparatus for combining video signals to produce an output video signal representing a video effect comprises a first static effect channel for generating a first full-field video signal, a second static effect channel for generating a second full-field video signal, means for generating first and second transition control signals each having a full-field domain and a predetermined range, the sum of the first and second control signals nowhere exceeding the predetermined range, and arithmetic means for multiplying the first full-field video signal by the first transition control signal to generate a first addend signal, multiplying the second full-field video signal by the second transition control signal to generate a second addend signal, and summing the first and second addend signals to provide the output video signal.

In accordance with a second aspect of the invention, a method for combining video signals to provide an output video signal representing a video effect comprises generating a first full-field video signal representing a first static effect, generating a second full video field signal representing a second static effect, generating first and second transition control signals each having a full-field domain and a predetermined range, the sum of the first and second transition control signals nowhere exceeding the predetermined range, multiplying the first full-field video signal by the first transition control signal to provide a first addend signal, multiplying the second full-field video signal by the second transition control signal to provide a second addend signal, and summing the first and second addend signals to provide the output video signal.

BRIEF DESCRIPTION OF THE DRAWINGS

For a better understanding of the invention, and to show how the same may carried into effect, further reference will be made, by way of example, to the accompanying drawings in which.

DETAILED DESCRIPTION

Figure 3A:
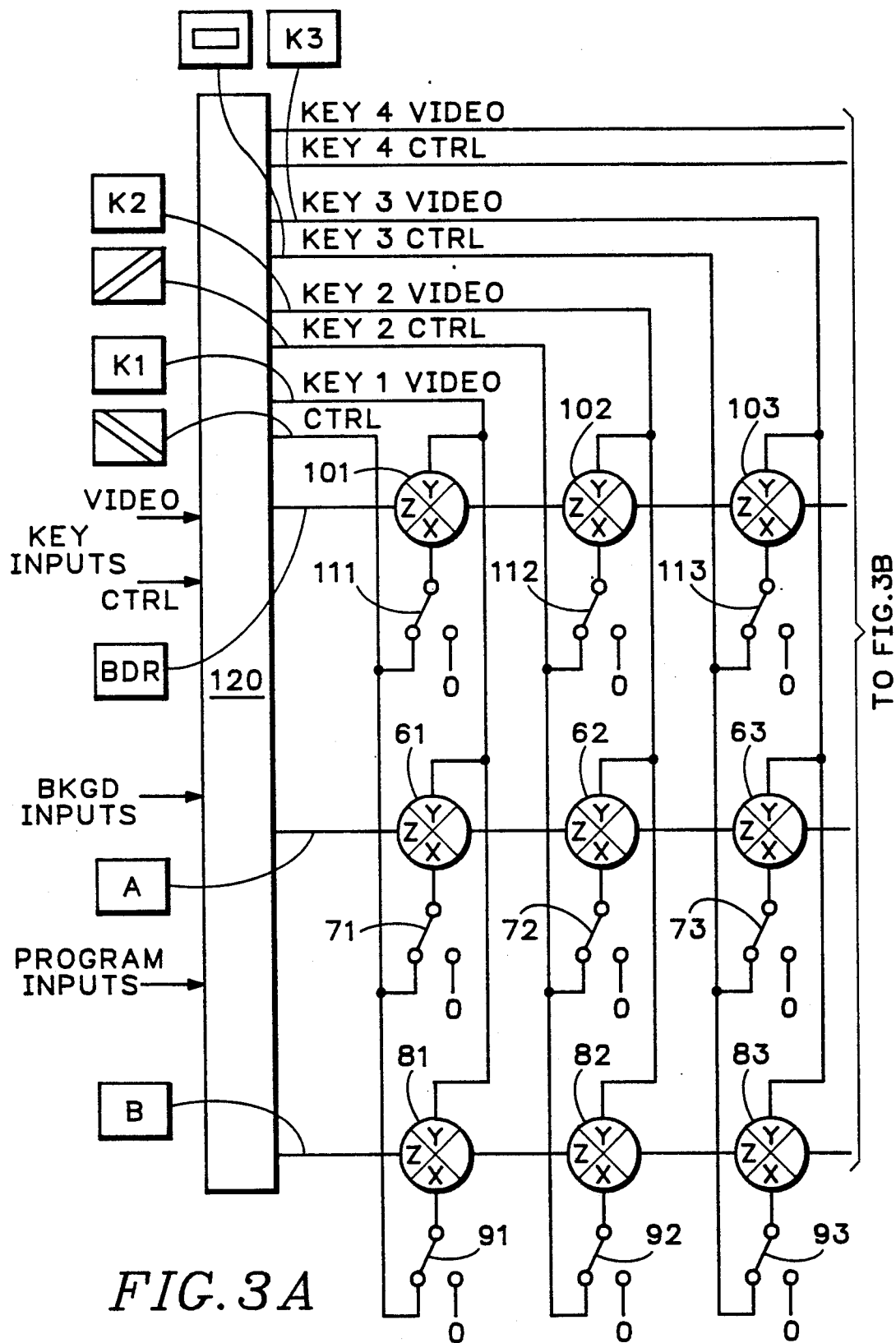
FIGS. 3A and 3B are block diagrams of an M/E device embodying the present invention.
Figure 3B:
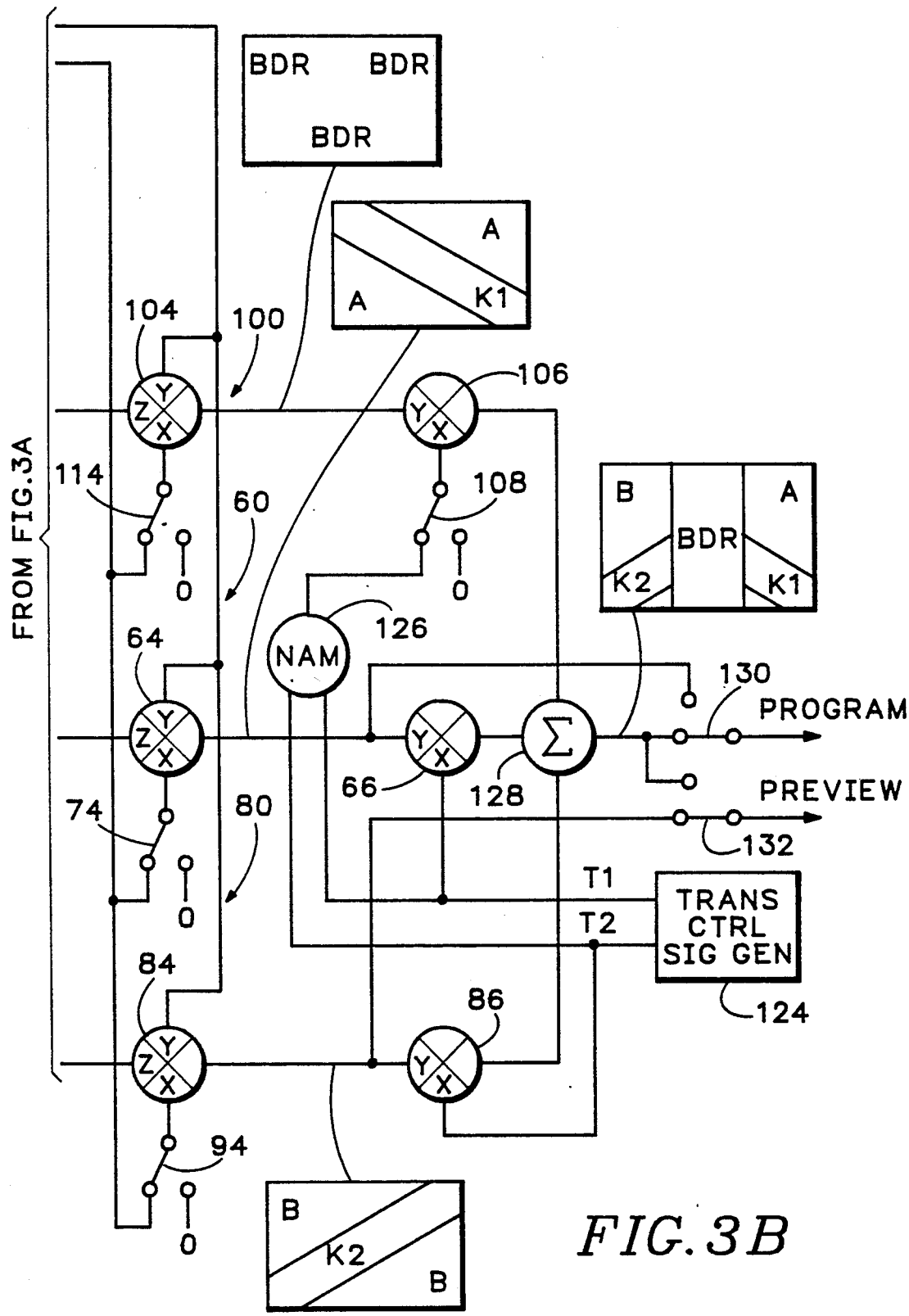

The M/E device shown in FIG. 3 has three static effect channels 60, 80 and 100, composed of mixers 61-64, 81-84 and 101-104 respectively. Channels 60 and 80 are program channels and channel 100 is a transition channel. The input terminals of the three channels 60, 80 and 100 are connected to respective output terminals of a video/key input selector 120, whereby respective full-field video signals may be applied to the Z inputs of mixers 61, 81 and 101. Input selector 120 also has four key video output terminals designated key 1 video-key 4 video and four key control output terminals designated key 1 control-key 4 control respectively. The output key 1 video is connected to the Y inputs of mixers 61, 81 and 101, and the key 2 video, key 3 video and key 4 video outputs of input selector 120 are connected in similar manner to the other mixers of channels 60, 80 and 100. The X inputs of mixers 61-64, 81-84 and 101-104 are connected to respective switches 71-74, 91-94 and 111-114. The key 1 control output of input selector 120 is connected to one terminal each of switches 71, 91 and 111, and accordingly each of those switches can select either logical 0 or key 1 control. The key 2 control, key 3 control and key 4 control outputs of input selector 120 are connected in similar manner to the switches associated with the other mixers of channels 60, 80 and 100. In this fashion, each channel is able to generate a montage video signal representing a static effect composed of a background and one or more keys.

The outputs of mixers 64, 84 and 104 are connected to the Y inputs of respective multipliers 66, 86 and 106. The X inputs of mixers 66 and 86 receive transition control signals T1 and T2 from a transition control signal generator 124, while the X input of mixer 106 is connected to a switch 108 that is able to select either 0 or a signal NOT (T1+T2) provided by a positive non-additive mixer 126. As in the case of FIG. 1, the transition control signals T1 and T2 can each range between 0, or off, and 1, or on. The sum of the transition control signals T1 and T2 nowhere exceeds 1. The outputs of multipliers 66, 86 and 106 are connected to a summation circuit 128, the output of which is connected through a switch 130 to the program output terminal of the M/E device. The output of channel 80 is connected by a switch 132 to a preview output terminal of the ME device.

It can readily be seen that by appropriately setting the switches 71-74, 91-94, and 111-114, the three channels 60, 80 and 100 are able to provide montage video signals representing the three static effects illustrated adjacent the respective outputs of those channels. Accordingly, the settings of the switches 71-74, 91-94 and 111-114 enable the operator to determine directly the nature of the static effects that will be provided by the three channels.

Figure 1:
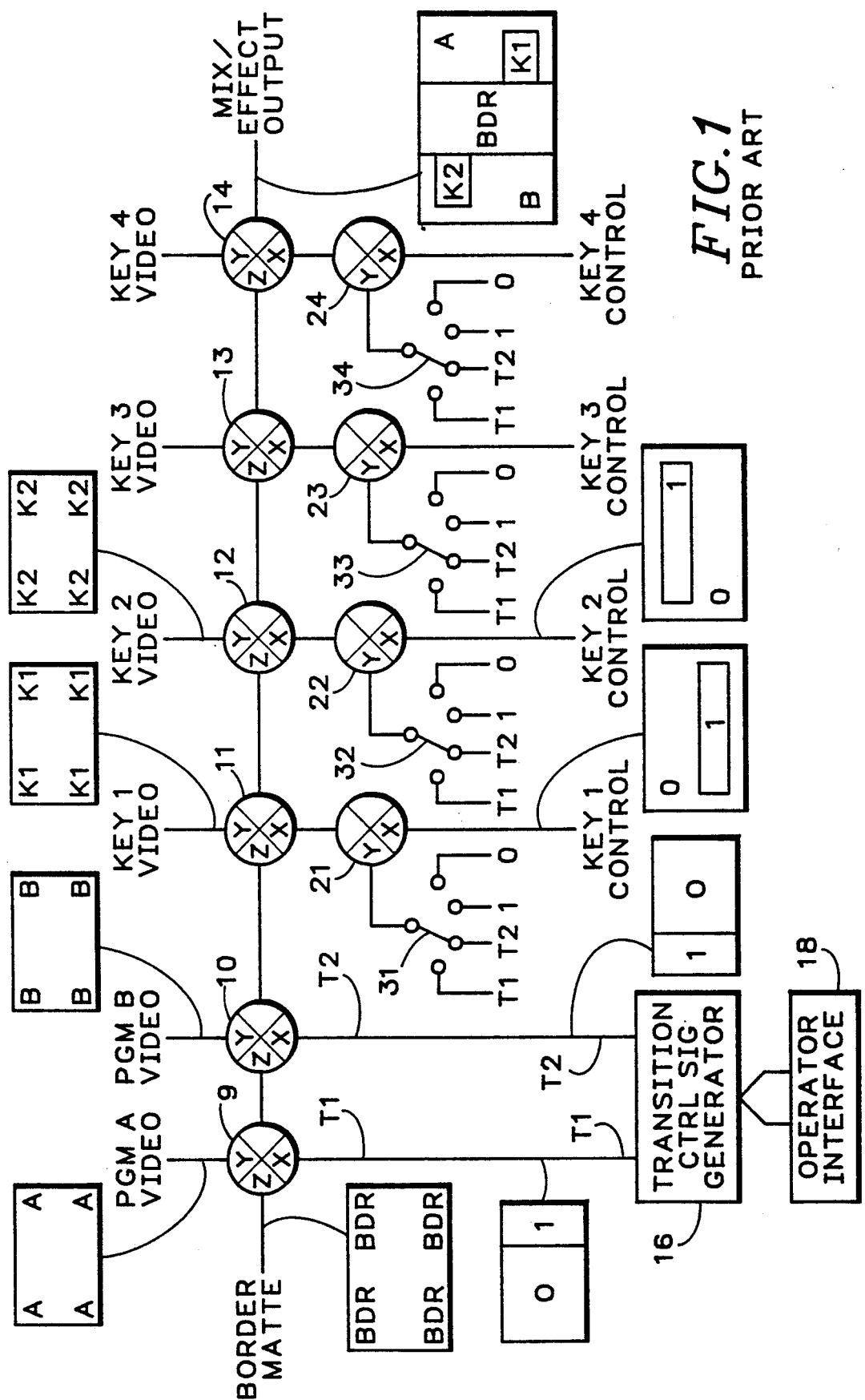
FIG. 1 is a block diagram of a serial M/E device.
Figure 2:
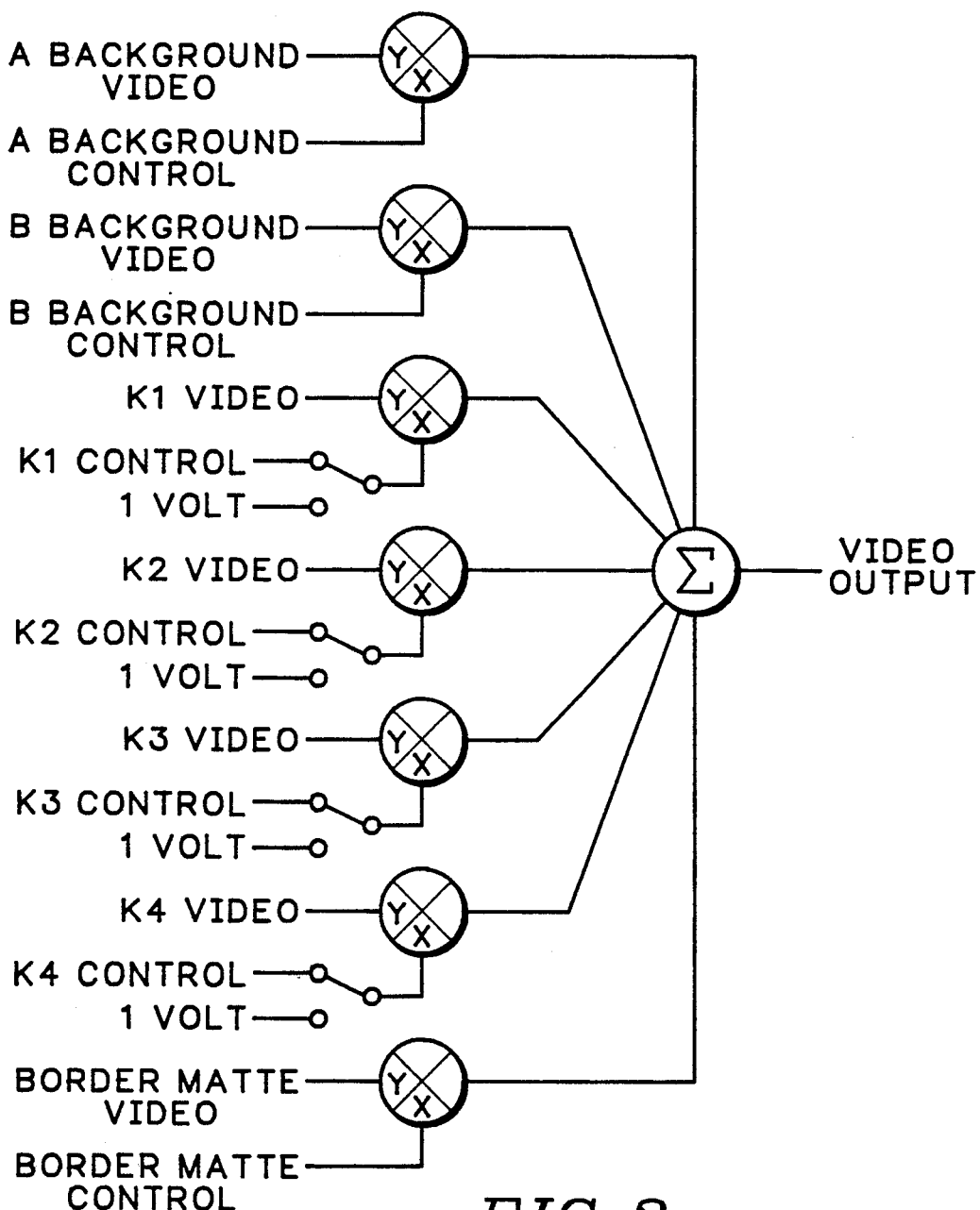
FIG. 2 is a block diagram of a parallel M/E device.

If the transition control signal T1 is 1 for the entire field (which implies that signal T2 is 0 for the entire field), the effect provided at the output of summation circuit 128 is the same as that at the output of channel 60. If there is a transition such that signal T1 becomes 0 for the entire field and signal T2 becomes 1 for the entire field, the output effect is the same as that at the output of channel 80. If the transition control signal T1 is 1 for a region at the right of the field and is 0 for the rest of the field, and the transition control signal T2 is 1 for a region at the left of the field and is 0 for the rest of the field, then the output effect shown adjacent the output of summation circuit 128 is provided. If the size of the region for which the transition control signal T1 is 1 decreases and the size of the region for which signal T2 is 1 increases, an effect similar to that described with reference to FIG. 1 is provided.

With switches 130, 132 in the positions shown, the ME device shown in FIG. 3 provides a transition from the on-air effect to the next effect at the program output. A preview of the next effect is provided at the preview output. By toggling each of the switches 130 and 132 to the opposite state, the on-air effect is provided at the program output terminal and a signal representing the transition from the on-air effect to the next effect can be provided at the preview output.

Figure 4:
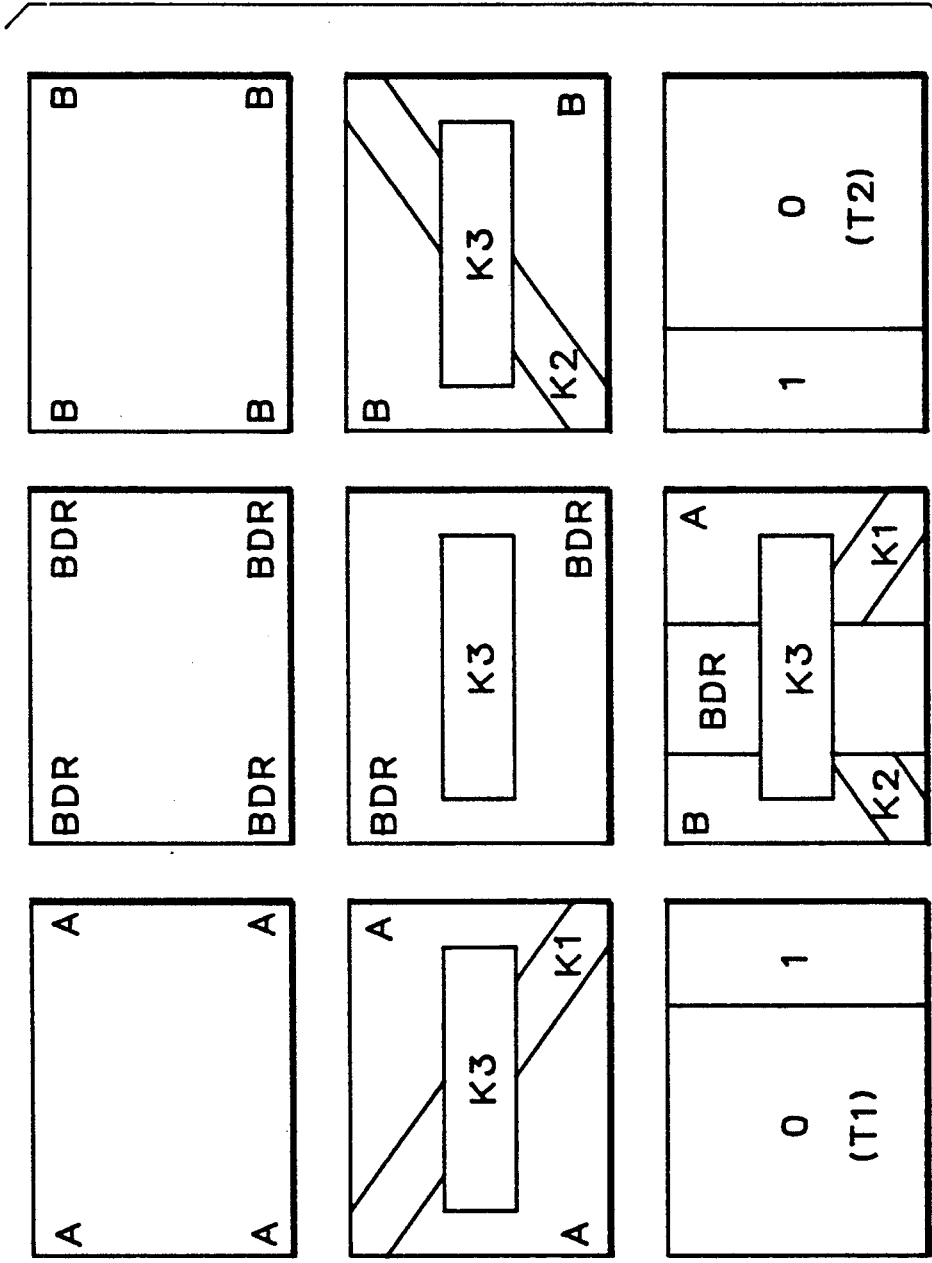
FIG. 4 illustrates various video fields and the manner in which they can be combined by the M/E device shown in FIG. 3.

Operation of the ME device shown in FIG. 3, as described so far, requires only one video mixer in each program channel and does not require a video mixer in the transition channel. However, it is desirable that each program channel should include at least two video mixers to provide a static effect composed of a background and two keys, and by connecting the mixers as shown it is possible to provide a transition in which the key changes but the background remains the same, or a transition in which the background changes but the key remains the same, or a transition in which both the background and the key change. It is desirable to include video mixers in the transition channel because it allows combination of the border matte with a key. If the key that is combined with the border matte is also included in the static effects at the outputs of channels 60 and 80, the key is preserved through the transition and appears in front of the border matte during the wipe, as shown in FIG. 4. FIG. 4 shows in the top row of fields the inputs to channels 60, 80 and 100, in the second row the outputs of channels 60, 80 and 100 and in the bottom row the transition control signals T1 and T2 and the result of combining the outputs of the three channels under control of the transition control signals, in the manner described with reference to FIG. 3. In the case of program channel 60, the static effect is composed of program A video plus keys 1 and 3, in the case of program channel 80, the effect is composed of program B video plus keys 2 and 3, and in the case of the transition channel 100, the effect is composed of the border matte plus key 3. Key 3 might be, for example, a title, in which case the transition takes place behind the title.

It is not essential that the background signals received by channels 60 and 80 be different. If the two signals are the same, the effect might be addition of a key to the on-air effect or removal of a key from the on-air effect.

The switch 108 allows the operator to prevent the output of channel 100 from contributing to the program output. Generally, this would arise where it is intended that the sum of T1 and T2 be 1 for the entire field. In such a case, there might be a possibility of NOT (T1+T2) being 1 at some point due to an overlooked circumstance, and it might then be desired that the field should be black rather than the color of the border matte at that point.

It will be appreciated that the invention is not restricted to the particular embodiment that has been described, and that variations may be made therein without departing from the scope of the invention as defined in the appended claims and equivalents thereof.

I claim:

1. Apparatus for combining video signals to provide an output video signal representing a video effect, comprising:
   a first static effect channel for generating a first full-field video signal,
   a second static effect channel for generating a second full-field video signal,
   a third static effect channel for generating a third full-field video signal,
   means for generating first and second transition control signals each having a full-field domain and a predetermined range, the sum of the first and second transition control signals nowhere exceeding said predetermined range,
   means for generating a third transition control signal having a full-field domain and of which the magnitude at each point in the field is equal to said predetermined range minus the sum of the magnitude of the first transition control signal at said point and the magnitude of the second transition control signal at said point, and
   arithmetic means for multiplying the first full-field video signal by the first transition control signal to generate a first addend signal, multiplying the second full-field video signal by the second transition control signal to generate a second addend signal, multiplying the third full-field video signal by the third transition control signal to generate a third addend signal, and summing the first, second and third addend signals to provide the output video signal,
   and wherein the first and second static effect channels each include at least one video mixer having first and second video input terminals and a mix control terminal, each video mixer being operative to combine first and second input video signals in dependence upon a mix control signal received at its mix control terminal to provide a full-field output video signal.

2. Apparatus according to claim 1, wherein the arithmetic means comprise first and second multipliers for generating the first and second addend signals respectively, and an adder for summing the first and second addend signals.

3. Apparatus according to claim 1, wherein the means for generating the third transition control signal comprise means for receiving the first and second transition control signals and forming the negated sum of the first and second transition control signals.

4. A method for combining video signals to provide an output video signal representing a video effect, said method comprising:
   generating a first full-field video signal representing a first static effect,
   generating a second full-field video signal representing a second static effect,
   generating a third full-field video signal representing a third static effect,
   generating first and second transition control signals each having a full-field domain and a predetermined range, the sum of the first and second transition control signals nowhere exceeding the predetermined range,
   generating a third transition control signal having a full-field domain and of which the magnitude at each point in the field is equal to said predetermined range minus the sum of the magnitude of the first transition control signal at said point and the magnitude of the second transition control signal at said point, and
   multiplying the first full-field video signal by the first transition control signal to provide a first addend signal, multiplying the second full-field video signal by the second transition control signal to provide a second addend signal, multiplying the third full-field video signal by the third transition control signal to generate a third addend signal, and summing the first, second and third addend signals to provide the output video signal,
   each of said first and second full-field video signals being generated by combining a first input video signal that represents a background and a second input video signal that represents a key in dependence upon a mix control signal whereby the first and second static effects are each composed of a background and a key.

5. A method according to claim 4, comprising generating the third transition control signal by negating the sum of the first transition control signal and the second transition control signal.

6. Video effects apparatus comprising:
an input selector for providing first and second full-field background video signals and at least first and second key video signals and key control signals associated therewith,
a first static effect channel for receiving the first background video signal and at least the first key video signal and associated key control signal and generating a first full-field montage video signal,
a second static effect channel for receiving the second background video signal and at least the second key video signal and associated key control signal and generating a second full-field montage video signal,
means for generating first and second transition control signals each having a full-field domain and a predetermined range, the sum of the first and second transition control signals nowhere exceeding said predetermined range, and
arithmetic means for multiplying the first full-field montage video signal by the first transition control signal to generate a first addend signal, multiplying the second full-field montage video signal by the second transition control signal to generate a second addend signal, and summing the first and second addend signals to provide an output video signal.

7. Apparatus according to claim 6, wherein the first and second static effect channels each comprise:
a first video mixer having a first video input terminal, a second video input terminal, a mix control terminal, and an output terminal, the first video mixer being operative to provide at its output terminal a video signal that results from combining the video signals received at its video input terminals in dependence upon a mix control signal received at its mix control terminal,
a first switch connected to the mix control terminal of the first video mixer,
a second video mixer having a first video input terminal connected to the output terminal of the first video mixer, a second video input terminal, a mix control terminal, and an output terminal coupled to the arithmetic means, the second video mixer being operative to provide at its output terminal a video signal that results from combining the video signals received at its video input terminals in dependence upon a mix control signal received at its mix control terminal, and
a second switch connected to the mix control terminal of the second video mixer,
and wherein the first video input terminal of the first video mixer of the first static effect channel is connected to receive the first full-field background video signal from the input selector, the first video input terminal of the first video mixer of the second static effect channel is connected to receive the second full-field background video signal from the input selector, the second video input terminal of the first video mixer of the first static effect channel and the second video input terminal of the first video mixer of the second static effect channel are connected to receive the first key video signal from the input selector, the first switch of the first static effect channel and the first switch of the second static effect channel are each operative to select the key control signal associated with the first key video signal, and the second switch of the first static effect channel and the second switch of the second static effect channel are each operative to select the key control signal associated with the second key video signal.

8. Apparatus for combining video signals to provide an output video signal representing a video effect, said apparatus having a program output terminal and a preview output terminal and comprising:
a first static effect channel for generating a first full-field video signal,
a second static effect channel for generating a second full-field video signal,
means for generating first and second transition control signals each having a full-field domain and a predetermined range, the sum of the first and second transition control signals nowhere exceeding said predetermined range,
arithmetic means for multiplying the first video signal by the first transition control signal to generate a first addend signal, multiplying the second full-field video signal by the second transition control signal to generate a second addend signal, and summing the first and second addend signals to provide the output video signal, and
output selector means for connecting the program output terminal either to the output of the arithmetic means or to the output of the first static effect channel and for connecting the preview output terminal either to the output of the arithmetic means or to the output of the second static effect channel.

9. Apparatus according to claim 8, wherein the output selector means comprise a program output selector switch for connecting either the output of the arithmetic means or the output of the first static effect channel to the program output terminal and a preview output selector switch for connecting either the output of the arithmetic means or the output of the second static effect channel to the preview output terminal.

10. Apparatus for combining video signals to provide an output video signal representing a video effect, comprising:
a first static effect channel for generating a first full-field video signal,
a second static effect channel for generating a second full-field video signal,
a third static effect channel including at least one video mixer having first and second video input terminals and a mix control terminal, the video mixer being operative to combine first and second input video signals in dependence upon a mix control signal received at the mix control terminal to provide a third full-field video signal,
means for generating first and second transition control signals each having a full-field domain and a predetermined range, the sum of the first and second transition control signals nowhere exceeding said predetermined range,
means for generating a third transition control signal having a full-field domain and of which the magnitude at a point in the field is equal to said predetermined range minus the sum of the magnitude of the first transition control signal at said point and the magnitude of the second transition control signal at said point, and arithmetic means for multiplying the first video signal by the first transition control signal to generate a first addend signal, multiplying the second full-field video signal by the second transition control signal to generate a second addend signal, multiplying the third full-field video signal by the third transition control signal to generate a third addend signal, and summing the first, second and third addend signals to provide the output video signal.

11. Apparatus according to claim 10, wherein the first and second static effect channels each include at least one video mixer having first and second video input terminals and a mix control terminal, each video mixer being operative to combine first and second input video signals in dependence upon a mix control signal received at its mix control terminal to provide a full-field video signal.

12. Apparatus according to claim 11, wherein the second video input terminal of the mixers in the first, second and third static effect channels are each connected together, the mix control input terminals of the mixers in the first, second and third static effect channels are connected to first, second and third switches respectively, and each of the first, second and third switches has a contact connected to a key control input terminal of the apparatus.

* * * * *